United States Patent
Keilhofer et al.

(10) Patent No.: US 6,795,755 B2
(45) Date of Patent: Sep. 21, 2004

(54) METHOD FOR OPERATING A LOAD-DEPENDENT POWER-GENERATING SYSTEM IN A VEHICLE

(75) Inventors: Klaus Keilhofer, Waldstetten (DE); Helmut Lorenz, Oberboihingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/091,598

(22) Filed: Mar. 7, 2002

(65) Prior Publication Data

US 2002/0138183 A1 Sep. 26, 2002

(30) Foreign Application Priority Data

Mar. 10, 2001 (DE) .......................... 101 11 562

(51) Int. Cl.[7] .......................... G06F 7/00; G06F 17/00
(52) U.S. Cl. .......................... 701/22; 318/140; 180/165; 180/54.1
(58) Field of Search .......................... 701/22, 36, 53, 701/1; 318/140, 153; 180/165, 54.1

(56) References Cited

U.S. PATENT DOCUMENTS

| | | | | |
|---|---|---|---|---|
| 5,113,721 A | * | 5/1992 | Polly .......................... | 477/80 |
| 5,474,507 A | * | 12/1995 | Streib et al. .......................... | 477/129 |
| 5,533,583 A | * | 7/1996 | Adler et al. .......................... | 180/65.4 |
| 5,780,981 A | * | 7/1998 | Sonntag et al. .......................... | 318/139 |
| 5,877,600 A | * | 3/1999 | Sonntag .......................... | 318/139 |
| 6,188,945 B1 | * | 2/2001 | Graf et al. .......................... | 701/58 |
| 6,387,007 B1 | * | 5/2002 | Fini, Jr. .......................... | 475/268 |

FOREIGN PATENT DOCUMENTS

| | | |
|---|---|---|
| DE | 4133014 | 4/1993 |
| DE | 19540824 | 5/1997 |
| DE | 19541575 | 12/1998 |
| EP | 0633157 | 5/1997 |

* cited by examiner

*Primary Examiner*—William A. Cuchlinski, Jr.
*Assistant Examiner*—Olga Hernandez
(74) *Attorney, Agent, or Firm*—Crowell & Moring LLP

(57) ABSTRACT

In a method for operating a load-dependent power-generating system which supplies electric energy to at least one electric drive motor in a vehicle, a performance setpoint value is determined for the electric drive motor from an accelerator pedal position, and a power request is made to the power-generating system before a torque request to the drive motor. Dynamic movement parameters of the accelerator pedal are also used to calculate the performance setpoint value.

11 Claims, 2 Drawing Sheets

METHOD FOR OPERATING A LOAD-DEPENDENT POWER-GENERATING SYSTEM IN A VEHICLE

BACKGROUND AND SUMMARY OF THE INVENTION

This application claims the priority of German patent application 101 11 562.8, filed 10 Mar. 2001, the disclosure (s) of which is (are) expressly incorporated by reference herein.

The invention relates to a method for operating a load-dependent power-generating system in a vehicle.

European patent document EP 0633 157 B1 discloses a method of the generic type for dynamically controlling the performance of a fuel cell unit in vehicles with an electric drive motor. A performance setpoint value for the fuel cell unit is determined from the accelerator pedal position, and the performance of the fuel cell unit is controlled by controlling the mass flow rate of the oxidant which is fed to the fuel cell unit. In order to prevent the electric drive motor's requesting more performance from the fuel cell unit than it can supply at a given time, the electric drive motor is supplied with a corrected performance setpoint value which is determined from the actual oxidant mass flow rate.

German patent document DE 195 41 575 C2 discloses a method for determining a power setpoint value for a load-dependent power-generating system (in particular for a fuel cell system) in an electric vehicle, in which setpoint values for the motor train currents of the electric drive motor are determined on the basis of the accelerator pedal position. The performance setpoint value for the power-generating system is generated from the setpoint values for the motor train currents of the electric drive motor.

One object of the present invention is to improve the dynamic behavior of the control methods described previously.

This and other objects and advantages are achieved by the control method according to the invention for operating a load dependent power-generating system that supplies electric energy to at least one electric drive motor in a vehicle. A performance setpoint value is determined for the electric drive motor from an accelerator pedal position, and a power request is made to the power-generating system before a torque request to the drive motor. Dynamic movement parameters of the accelerator pedal are also used to calculate the performance setpoint value.

The advantage of the invention is that the evaluation of the accelerator pedal movement/position permits a predictive calculation of the performance setpoint value. In this manner, the time delay between the requested performance and the running up or running down of the power-generating system can be bridged. As a result of the earlier request of the predictively calculated, future performance, the power-generating system has more time to generate the drive current, and the electric drive motor can reach the level of performance desired by the driver more quickly and more dynamically. Taking into account the accelerator pedal movement leads to an improvement in the dynamics in comparison with methods which use only the accelerator pedal position.

Of course, the features which are mentioned above and which are to be explained below can be used not only in the respectively given combination but also in other combinations or alone without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
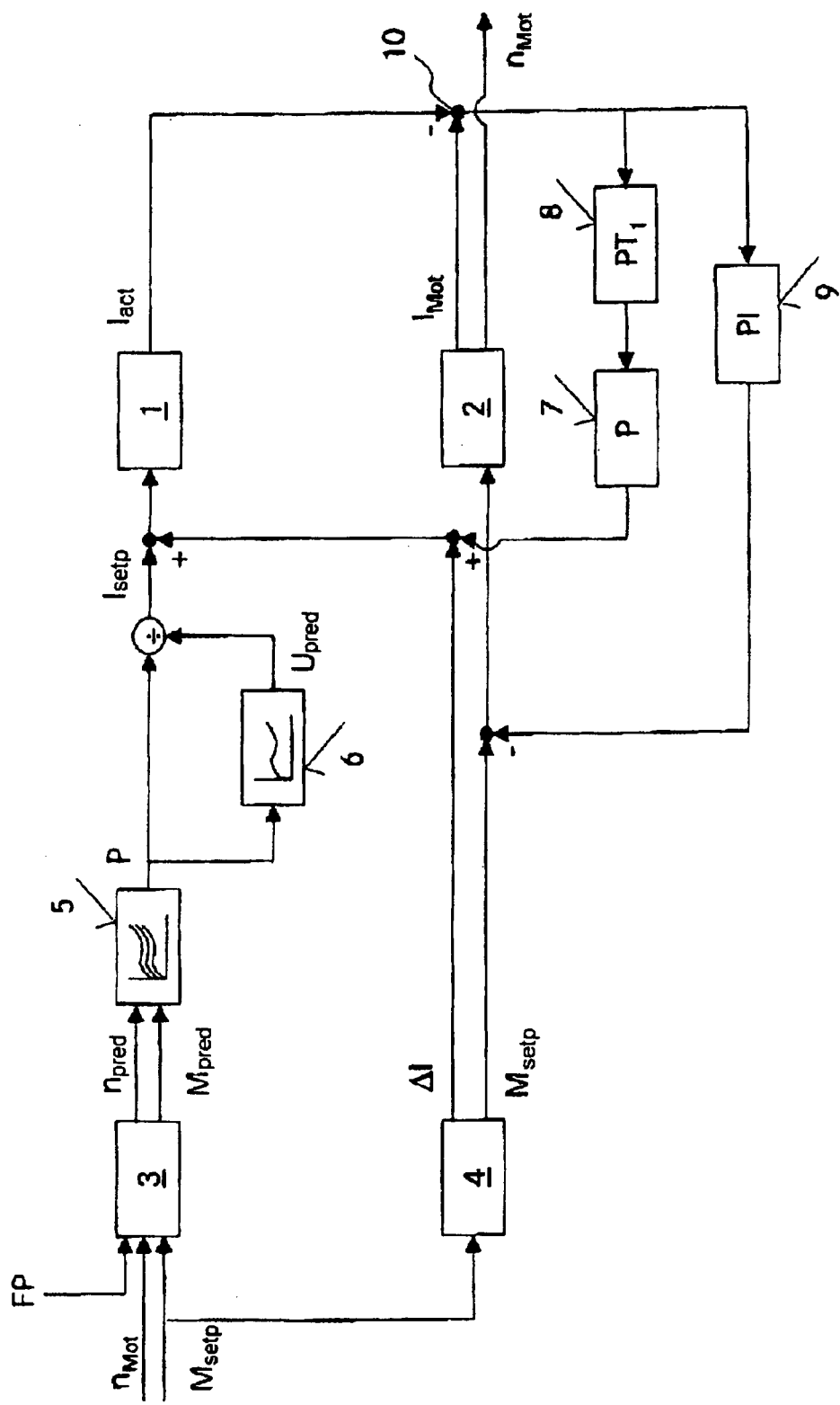
FIG. 1 is a block diagram which illustrates the method according to the invention.

The method according to the invention for operating a load-dependent power-generating system, illustrated in FIG. 1, is suitable in particular for use with performance requirements which vary greatly, such as is the case in vehicles. The power-generating system 1 (preferably a fuel cell system) supplies an electric drive motor 2 and further electric loads (not illustrated) in a vehicle with energy. In block 3, a predictive rotational speed $n_{pred}$ and a predictive setpoint torque $M_{pred}$ of the electric drive motor 2 are generated based on accelerator pedal movement (in particular the angular acceleration of the accelerator pedal, and the accelerator pedal position FP), rotational speed $n_{Mot}$ of the electric drive motor 2 at a given time and the setpoint torque $M_{setp}$ of the electric drive motor 2 at a given time. (FP designates the accelerator pedal position and the accelerator pedal movement.) In block 5 a performance setpoint value P for the electric drive motor 2 is determined by reference to a characteristic diagram from the predictive rotational speed $n_{pred}$ and the predictive setpoint torque $M_{pred}$. In block 6, a predictive voltage $U_{pred}$ of the power-generating system 1 is generated from the performance setpoint value P using a further characteristic diagram. The predictive power setpoint value $I_{setp}$ for the power-generating system 1 is then obtained by dividing the performance setpoint value P by the predictive voltage $U_{pred}$.

In order to utilize the maximum dynamics of the system, the power request to the power-generating system 1 is made before the performance or torque request to the electric drive motor 2. As a result, the running-up time of the power-generating system can be bridged. By a mathematical evaluation of the accelerator pedal movement and of the accelerator pedal position, the power request can be calculated predictively. Both the speed and the range of the accelerator pedal travel are taken into account in the evaluation. If, for example, the accelerator pedal is depressed quickly starting from a constant accelerator pedal position, a correspondingly high performance and a corresponding power are requested. However, if this takes place near to or at full-load operation, the requested additional performance is limited by the maximum available performance of the power-generating system and this is correspondingly taken into account.

As a result of the predictive calculation of the voltage $U_{pred}$ of the power-generating system 1, the dynamics and the precision of the calculation of the power setpoint value $I_{setp}$ are significantly improved. A further advantage is that the calculation of the predictive voltage $U_{pred}$ replaces a measured voltage of the power-generating system 1 being fed back with the inclusion of faults.

Taking into account the rotational speed $n_{Mot}$ and the setpoint torque $M_{setp}$ of the electric drive motor at a given time leads to a rapid calculation of the power request $I_{setp}$ for the power-generating system, which ensures a continuous transition between the state at a given time and the future state of the electric drive motor corresponding to the driver's request. This results in steady driving characteristics of the vehicle.

In addition, in block 4 a power correction value ΔI is determined from the change in the torque setpoint value $M_{setp}$ of the electric drive motor 2 and is summed with the power setpoint value $I_{setp}$ for the power-generating system 1. The input value of block 4 is the torque setpoint value $M_{setp}$, and the output values are the power correction value ΔI and the torque setpoint value $M_{setp}$. The torque setpoint value $M_{setp}$ constitutes an input variable of the electric drive motor 2. In block 4, the rise in the torque setpoint value $M_{setp}$ is monitored, preferably by means of differentiation. Given a corresponding increase in the torque setpoint value $M_{setp}$, the power request to the power-generating system 1 is increased by adding a power correction value ΔI to the power setpoint value $I_{setp}$ for the power-generating system.

The increase in the setpoint torque $M_{setp}$ is monitored so that it is possible to react to instantaneous requests to the electric drive motor by components (not illustrated) which are present in the vehicle in addition to the accelerator pedal (for example cruise controller, creeper, ESP), with a corresponding increase in the power request or the setpoint power value $I_{setp}$ for the power-generating system 1. Advantageously, the combined instantaneous request of the components is evaluated, rather than the instantaneous request of each individual component. This reduces the need for computing power.

In addition, the power consumption $I_{Mot}$ of the electric drive motor 2 at a given time is determined and fed to a comparison point 10 of a control loop as a setpoint value. The power $I_{act}$ which is made available by the power-generating system is also determined and is fed to the comparison point 10 of the control loop as an actual value. In the comparison point 10, the power drain $I_{Mot}$ of the electric drive motor 2 at a given time is compared with the power $I_{act}$ made available by the power-generating system 1. The comparison result is filtered in block 8 and then fed to a first controller 7, which is used to adjust the power setpoint value $I_{setp}$ of the power-generating system 1 to the power drain $I_{Mot}$ of the electric drive motor 2 at a given time.

The first controller 7 is preferably a P controller (proportionally acting controller) and block 8 is a smoothing filter, for example a delay element 1 of the first order.

In addition, the comparison result of the comparison point 10 is fed to a second controller 9 (preferably a proportional-integral or "PI" controller) which is used to reduce the torque setpoint value $M_{setp}$ of the electric drive motor 2 when there is a positive comparison result. In a further preferred embodiment, the parameters of the second controller 9 are dependent on the rotational speed $n_{Mot}$ of the electric drive motor at a given time.

The first and/or the second controller 7, 9 can advantageously be used to compensate the difference between the power consumption $I_{Mot}$ of the electric drive motor at a given time and the power $I_{act}$ made available by the power-generating system 1.

Figure 2:
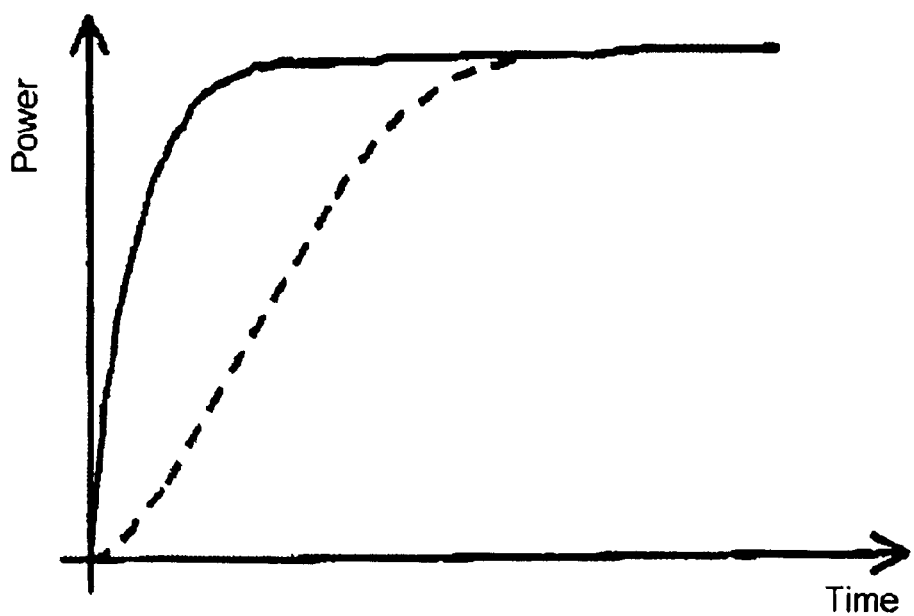
FIG. 2 is a power graph which shows the dynamics of the power setpoint value generated by the method according to the invention.

FIG. 2 is a power graph which shows the dynamic time variation of the power setpoint value which is generated with the method according to the invention. The continuous line represents the power setpoint value $I_{setp}$ which is generated with the method according to the invention, while the dashed curve represents a power setpoint value which is generated with a second method which determines the torque setpoint value for the electric drive motor from the accelerator pedal movement/position FP and generates the power setpoint value for the power-generating system from the torque setpoint value for the electric drive motor. The power setpoint value $I_{setp}$ which is determined by the method according to the invention reaches its steady-state value significantly more quickly than the power setpoint value determined with the second method. That is to say the dynamics of the method according to the invention are better than the dynamics of the second method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a load-dependent power-generating system which supplies electrical energy to at least one electric drive motor in a vehicle, comprising:
   determining a predictive performance setpoint value for the electric drive motor from an accelerator pedal position; and
   making a power request to the power-generating system based on said predictive performance set point value;
   determining a current performance setpoint value for the electric drive motor from said accelerator pedal position;
   making a power request to the electric drive motor based on said current performance setpoint value;
   wherein, in addition to accelerator pedal position, the accelerator pedal movement is used to calculate the predictive performance setpoint value.

2. A method for operating a load-dependent power-generation system which supplies electrical energy to at least one electric drive motor in a vehicle, comprising:
   determining a predictive performance setpoint value for the electric drive motor from an accelerator pedal position; and
   making a power request to the power-generating system based on said predictive performance set point value, before torque request to the drive motor; wherein,
   in addition to accelerator pedal position, the accelerator pedal movement is used to calculate the predictive performance setpoint value; and
   rotational speed of the electric drive motor at a given time, and a setpoint torque which is an input of the electric drive motor at the given time, are additionally used to calculate the predictive performance setpoint value.

3. The method according to claim 2, wherein said step of determining a predictive performance setpoint value comprises:
   generating a predictive rotational speed of the electric drive motor based on at least one of the accelerator pedal movement and the accelerator pedal position, and based on the rotational speed of the electric drive motor at a given time;
   generating a predictive setpoint torque of the electric drive motor based on at least one of accelerator pedal movement and accelerator pedal position, and based on the setpoint torque of the electric drive motor at the given time; and
   determining the predictive performance setpoint value from the predictive rotational speed and the predictive setpoint torque using a corresponding characteristic diagram.

4. A method for operating a load-dependent power-generating system which supplies electrical energy to at least one electric drive motor in a vehicle, comprising:

determining a predictive performance setpoint value for the electric drive motor from an accelerator pedal position; and making a power request to the power-generating system based on said predictive performance set point value, before a torque request to the drive motor; wherein, in addition to accelerator pedal position, the accelerator pedal movement is used to calculate the predictive performance setpoint value;

a predictive voltage of the power-generating system is generated from the predictive performance setpoint value; and a power setpoint value is determined from the performance setpoint value and the predictive voltage of the power-generating system.

5. The method according to claim 4, further comprising:

determining a power correction value as a function of a change of the a torque setpoint value which is an input of the electric drive motor; and summing the power correction value with the power setpoint value for the power-generating system.

6. A method for operating a load-dependent power-generating system which supplies electrical energy to at least one electric drive motor in a vehicle, comprising:

determining a predictive performance setpoint value for the electric drive motor from an accelerator pedal position; and making a power request to the power-generating system based on said predictive performance set point value, before a torque request to the drive motor; wherein, in addition to accelerator pedal position, the accelerator pedal movement is used to calculate the predictive performance setpoint value; the power consumption of the electric drive motor at a given time is determined and fed to a comparison point of a control loop as a setpoint value;

actual power which is made available by the power-generating system is determined and is fed to the comparison point of the control loop as an actual value;

the comparison point forms the difference between the power drain of the electric drive motor at the given time and the power made available by the power-generating system; and when there is a positive difference, a first controller increases the power setpoint value of the power-generating system.

7. The method according to claim 6, wherein when there is a positive difference a second controller reduces the torque setpoint value of the electric drive motor.

8. The method according to claim 6, wherein the first controller comprises a P controller with a delay element of the first order connected upstream.

9. The method according to claim 7, wherein the second controller comprises a PI controller.

10. The method according to claim 7, wherein the parameters of the second controller are dependent on rotational speed of the electric drive motor at a given time.

11. A method for operating a load-dependent power-generating system which supplies electrical energy to at least one electric drive motor in a vehicle, comprising:

determining a predictive performance setpoint value for the electric drive motor from an accelerator pedal position; and making a power request to the power-generating system based on said predictive performance set point value, before torque request to the drive motor; wherein, in addition to accelerator pedal position, the accelerator pedal movement is used to calculate the predictive performance setpoint value; and a fuel cell system is used as power-generating system.

* * * * *